(12) United States Patent
Nalluri et al.

(10) Patent No.: US 11,095,532 B2
(45) Date of Patent: *Aug. 17, 2021

(54) CONFIGURATION AND/OR DEPLOYMENT OF A SERVICE BASED ON LOCATION INFORMATION AND NETWORK PERFORMANCE INDICATORS OF NETWORK DEVICES THAT ARE TO BE USED TO SUPPORT THE SERVICE

(71) Applicant: Verizon Patent and Licensing Inc., Basking Ridge, NJ (US)

(72) Inventors: Sachindra K. Nalluri, Frisco, TX (US); Stephen R. Morris, Raleigh, NC (US); Jebaraj Daniel Kennet Jeyakumar, Apex, NC (US); Priya Moczygemba, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,286

(22) Filed: Oct. 23, 2020

(65) Prior Publication Data

US 2021/0044501 A1 Feb. 11, 2021

Related U.S. Application Data

(63) Continuation of application No. 16/455,436, filed on Jun. 27, 2019, now Pat. No. 10,833,961.

(51) Int. Cl.
*H04L 12/24* (2006.01)
*H04L 12/721* (2013.01)
*H04L 29/08* (2006.01)

(52) U.S. Cl.
CPC .......... *H04L 41/5041* (2013.01); *H04L 41/22* (2013.01); *H04L 41/5009* (2013.01); *H04L 45/68* (2013.01); *H04L 67/18* (2013.01)

(58) Field of Classification Search
CPC . H04L 63/0272; H04L 12/4641; H04L 43/16; H04L 45/586; H04L 45/021;
(Continued)

(56) References Cited

U.S. PATENT DOCUMENTS 8,255,524 B2 * 8/2012 Devitt .................... H04L 41/22
709/224
8,473,325 B2 * 6/2013 Barnhill, Jr. ............ H04L 67/02
705/7.29
(Continued)

*Primary Examiner* — Sargon N Nano

(57) ABSTRACT

A device receives a request for a service and identifies, based on information included in the request, a set of sites that include a set of network devices that are capable of being used to support the service. The device obtains network performance indicator (NPI) data that is associated with a subset of network devices, of the set of network devices, and that includes NPI values that satisfy a set of performance criteria. The device causes the NPI data to be made available via an interface accessible to a user. The device receives device selection data that specifies a plurality of network devices, of the subset of network devices, that have been selected by the user. The device causes cause the plurality of network devices to be configured in a manner that allows the plurality of network devices to support the service.

20 Claims, 9 Drawing Sheets

(58) Field of Classification Search
CPC ..... H04L 45/60; H04L 41/5041; H04L 41/22; H04L 41/5009; H04L 45/68; H04L 67/18; G06F 2201/815
See application file for complete search history.

(56) References Cited

U.S. PATENT DOCUMENTS

| | | | | |
|---|---|---|---|---|
| 8,868,063 | B2* | 10/2014 | Wang | H04B 17/318 |
| | | | | 455/423 |
| 9,584,445 | B2* | 2/2017 | Stubberfield | H04L 49/354 |
| 9,674,108 | B1 | 6/2017 | Ryan et al. | |
| 9,781,087 | B2* | 10/2017 | Chen | H04L 63/101 |
| 10,355,989 | B1 | 7/2019 | Panchal et al. | |
| 2008/0037532 | A1* | 2/2008 | Sykes | H04L 41/147 |
| | | | | 370/389 |
| 2009/0112932 | A1* | 4/2009 | Skierkowski | G06Q 10/06 |
| 2013/0036213 | A1 | 2/2013 | Hasan et al. | |
| 2015/0066673 | A1 | 3/2015 | Astore | |
| 2015/0195270 | A1 | 7/2015 | Chen | |
| 2015/0229548 | A1* | 8/2015 | Ralston | H04L 43/08 |
| | | | | 709/224 |
| 2015/0288678 | A1 | 10/2015 | Chen | |
| 2015/0341188 | A1 | 11/2015 | Fichou et al. | |
| 2016/0352682 | A1* | 12/2016 | Chang | H04L 67/1097 |
| 2018/0189501 | A1 | 7/2018 | Ogawa et al. | |
| 2018/0336109 | A1 | 11/2018 | Huang et al. | |
| 2020/0028758 | A1* | 1/2020 | Toilet | H04L 45/02 |
| 2020/0029372 | A1 | 1/2020 | Xu et al. | |
| 2020/0177543 | A1* | 6/2020 | Chang | H04L 61/103 |
| 2020/0213224 | A1 | 7/2020 | Cheng et al. | |

\* cited by examiner

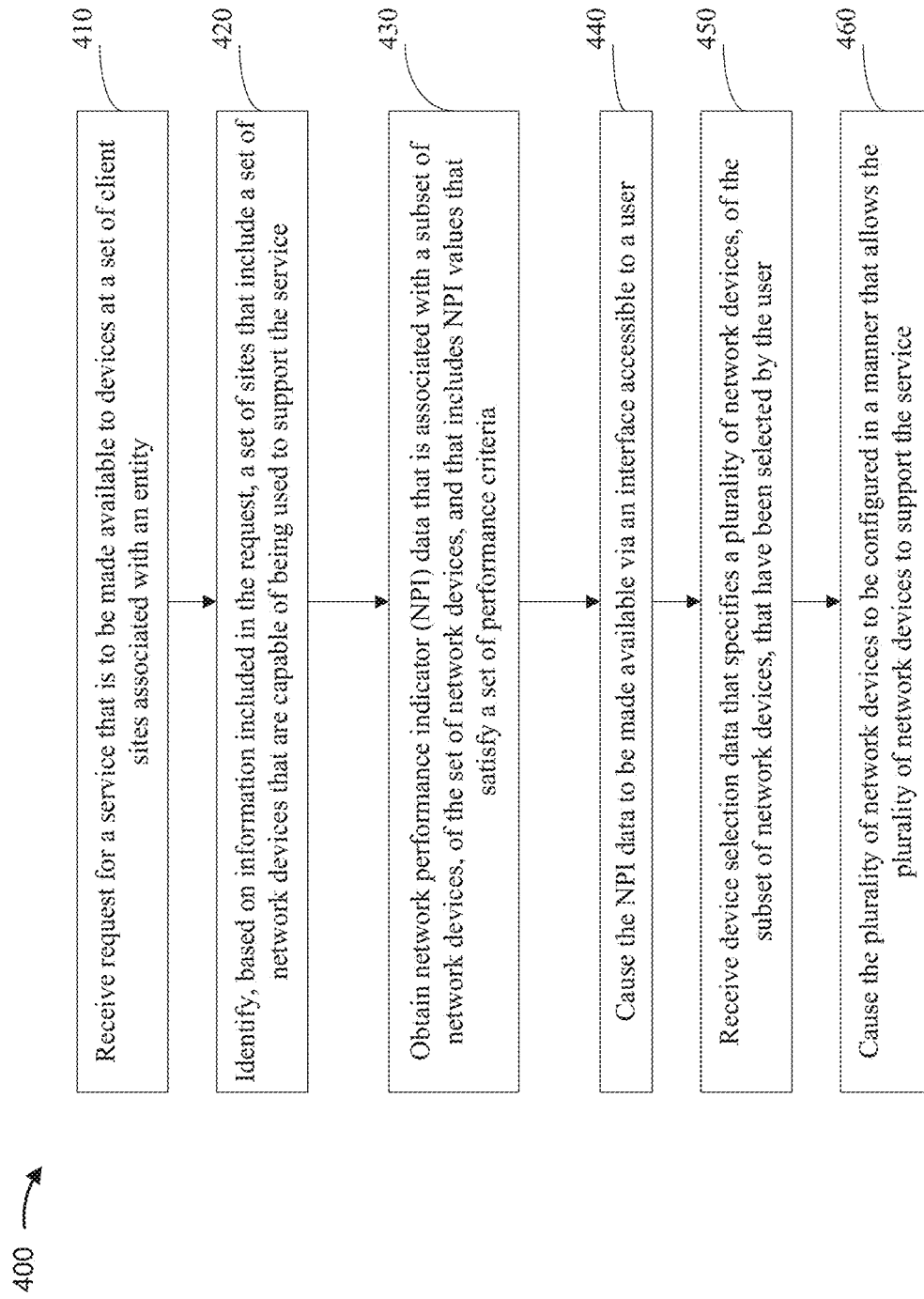

CONFIGURATION AND/OR DEPLOYMENT OF A SERVICE BASED ON LOCATION INFORMATION AND NETWORK PERFORMANCE INDICATORS OF NETWORK DEVICES THAT ARE TO BE USED TO SUPPORT THE SERVICE

RELATED APPLICATION

This application is a continuation of U.S. patent application Ser. No. 16/455,436, entitled "CONFIGURATION AND/OR DEPLOYMENT OF A SERVICE BASED ON LOCATION INFORMATION AND NETWORK PERFORMANCE INDICATORS OF NETWORK DEVICES THAT ARE TO BE USED TO SUPPORT THE SERVICE," filed Jun. 27, 2019, which is incorporated herein by reference.

BACKGROUND

In computer networking and telecommunications, a pseudo-wire may refer to an emulation of a point-to-point (P2P) connection over a packet switched network (PSN). The pseudo-wire may emulate the operation of a transparent wire that carries a service.

BRIEF DESCRIPTION OF THE DRAWINGS

FIG. 4 is a flow chart of an example process for using location information and network performance indicator (NPI) data for a set of network devices to assist in selection of a subset of the set of network devices to support a service and configuring and/or deploying the subset of the set of network devices to support the service.

DETAILED DESCRIPTION OF PREFERRED EMBODIMENTS

Figure 1A:
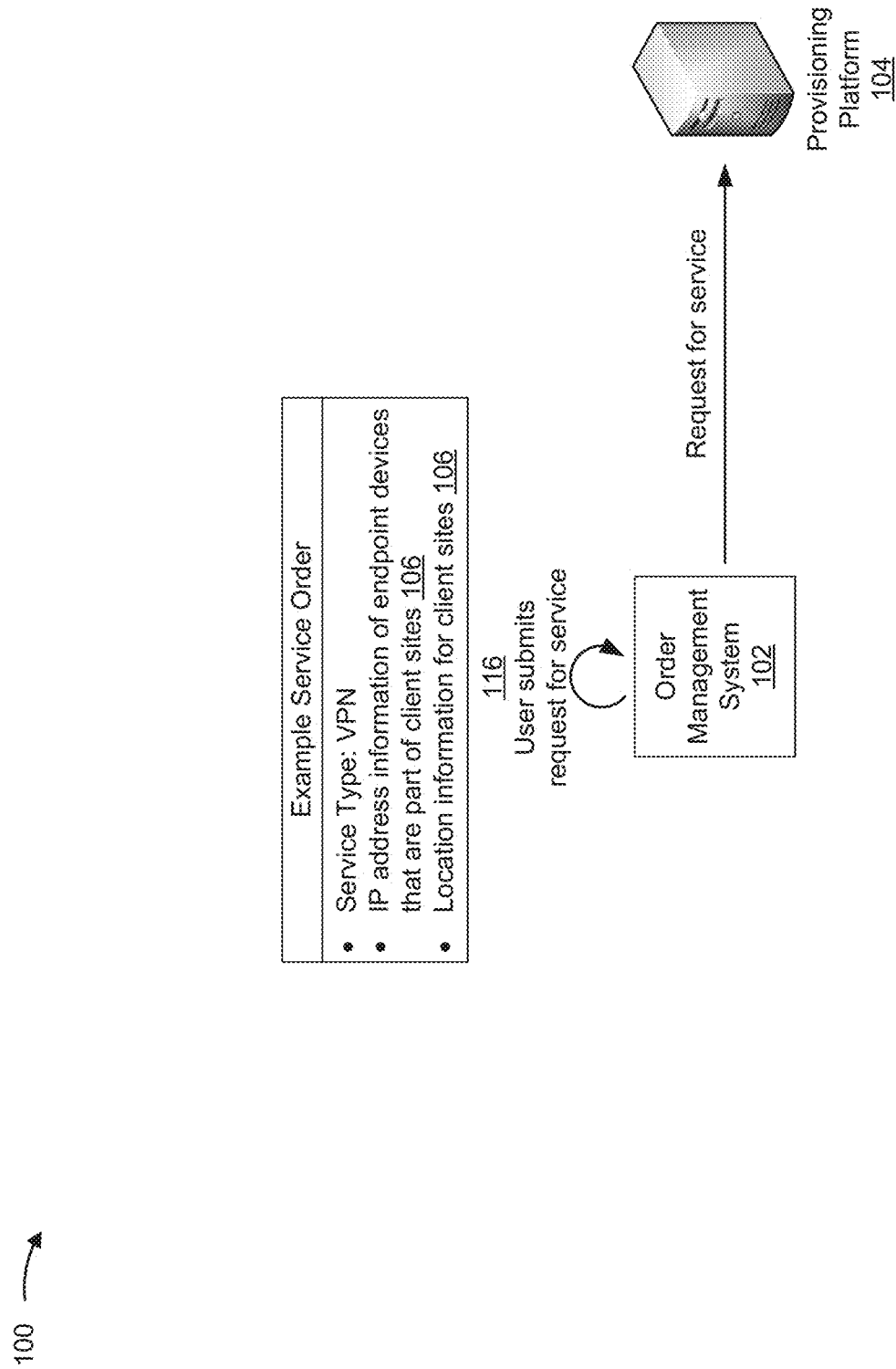
FIGS. 1A-1F are diagrams of one or more example implementations described herein.

The following detailed description of example implementations refers to the accompanying drawings. The same reference numbers in different drawings may identify the same or similar elements.

A service provider may have access to a set of network devices that are configured with pseudo-wire technology and that may be used to route traffic through a network. The set of network devices may include private cloud routers (PCRs) and/or similar types of devices. In some situations, a subset of the set of network devices may be selected to route traffic associated with a service. For example, the subset of network devices may be selected (e.g., from the set of network devices) and may use the pseudo-wire technology to emulate a P2P connection between two or more endpoint devices. In this case, the subset of network devices may be selected based on location information of sites that host the set of network devices. This may allow the subset of network devices to support traffic of the service via a connection that is emulating the P2P connection.

However, as more network devices are added to the network (e.g., as a quantity of network devices, in the set of network devices, increases), selecting the subset of network devices exclusively based on location information may be inefficient and/or ineffective. For example, a densely populated region (e.g., a city, a county, and/or the like) may have multiple sites hosting network devices in the region. In this case, a set of network devices that are available to support the service may have effectively the same (or similar) location information. This may cause particular network devices to be selected that are sub-optimal selections relative to other available network devices in the region. If the particular network devices lack the resources needed to effectively support the service, resources (e.g., processing resources, network resources, and/or the like) may be wasted when network performance issues affect traffic of the service. Furthermore, resources of an entity requesting the service may be wasted if the entity is being charged for a network solution that is less cost effective than other available network solutions.

Some implementations described herein provide a provisioning platform to use location information to identify a set of eligible network devices (e.g., from a set of available network devices), to use network performance indicator (NPI) data to identify a subset of network devices (e.g., from the set of eligible network devices), to assist a user in selecting two or more network devices (from the subset of network devices), and to configure and/or deploy the two or more network devices in a manner that is able to support a service. For example, the provisioning platform may receive a request for a service that is to be made available to endpoint devices hosted within a set of client sites. The request may include location information specifying geographic locations of each respective client site. In this case, the provisioning platform may identify, based on the location information, a set of sites that include the set of eligible network devices (e.g., based on each respective site being within a threshold distance of at least one client site).

Additionally, the provisioning platform may obtain network performance indicator (NPI) data for a subset of network devices, of the set of eligible network devices, based on the NPI data satisfying a set of performance criteria. For example, the provisioning platform may cause performance criteria data that identifies the set of performance criteria to be provided to the set of eligible network devices. This may allow each network device, of the set of eligible network devices, to determine whether NPI values for that network device satisfy the set of performance criteria. In this case, the NPI data for the subset of network devices may include particular NPI values that satisfy the set of performance criteria, which may cause the NPI data for the subset of network devices to be provided to the provisioning platform.

Furthermore, the provisioning platform may cause the NPI data to be made available to a user via an interface, such as an application programming interface (API). This may allow the user (e.g., who may be a provisioning expert) to interact with a graphical user interface (GUI) to select the two or more network devices (e.g., from the subset of network devices). This may cause device selection data that specifies the two or more network devices to be provided to the provisioning platform. Additionally, the provisioning platform may cause the two or more network devices to be configured and/or deployed in a manner that allows the two or more network devices to support the service.

In this way, the provisioning platform efficiently and effectively configures and/or deploys the two or more network devices to support the service. By identifying the subset of network devices that are associated with NPI values that satisfy the set of performance criteria (and that also have optimal geographic locations), the provisioning platform conserves resources (e.g., processing resources, network resources, and/or the like) that an inferior solution would waste identifying a sub-optimal group of network devices (e.g., by identifying the sub-optimal group of network devices exclusively based on the location information), conserves resources that would otherwise be wasted configuring and/or deploying particular network devices that have insufficient resources to support the service, and/or the like. Furthermore, the provisioning platform conserves financial resources of an entity requesting the service (e.g., because the entity would not have to waste additional financial resources on a less cost effective solution).

FIGS. 1A-1F are diagrams of one or more example implementations 100 described herein. Example implementation(s) 100 may include an order management system 102, a provisioning platform 104, a set of client sites 106 (shown as Client Site 106-1 and Client Site 106-2), a set of sites 108 (shown as site cluster 108-1 and site cluster 108-2), a set of private cloud routers (PCRs) 110, a data storage device 112, and a provisioning portal 114.

While one or more implementations herein describe provisioning platform 104 as configuring and/or deploying one or more PCRs 110 to support a service, it is to be understood that this is provided by way of example. In practice, one or more implementations described herein may allow provisioning platform 104 to configure and/or deploy one or more other types of network devices (e.g., in addition to the one or more PCRs 110, instead of the one or more PCRs 110, and/or the like). Furthermore, while one or more implementations described herein allow provisioning platform 104 to configure and/or deploy the service, it is to be understood that this is provided by way of example. In practice, provisioning platform 104 may reconfigure and/or redeploy an existing service, may de-configure and/or decommission an existing service, and/or the like.

As shown in FIG. 1A, and by reference number 116, a user may interact with order management system 102 to submit a request for a service. For example, a user may interact with a first interface (e.g., which is part of order management system 102) to create a request for a service. In this case, the first interface may allow the user to submit the request by inputting free-form text, by uploading a document, by selecting one or more items from a menu, and/or the like.

The user may be an agent (e.g., an employee, a contractor, and/or the like) of an entity, such as an agent that is trained to submit orders for particular services. The service may include a layer two service (e.g., an Ethernet service, a virtual local area network (VLAN) service, a service using a point-to-point (P2P) circuit such as a private virtual circuit (PVC), an ELINE service, an ELAN service, a service using a pseudo-wire, and/or the like), a private internet protocol (PIP) service (e.g., a service using a preferred provider network (PPN) and/or a similar type of service), a service hosted over the Internet, and/or the like.

The request may include a service identifier that identifies a type of service that is being requested, a user identifier that identifies an agent submitting the request and/or an entity identifier that identifies the entity associated with the agent that is submitting the request, device information for a set of endpoint devices that are hosted by the set of client sites 106 and that are to send and/or receive traffic associated with the service, location information for the set of client sites 106 that support the set of endpoint devices, service preferences information of the entity, and/or the like.

The device information for the set of endpoint devices may include internet protocol (IP) address information, port information, and/or the like. The location information may identify geographic coordinates of the set of client sites 106 that include the set of endpoint devices. The service preferences information may include location preferences information that specify one or more location preferences of the entity (e.g., the entity may prefer that traffic not pass through a particular geographic area), network performance preferences that specify one or more network performance preferences of the entity (e.g., a path preference, a quality of service (QoS) preference, a security preference, a cost preference, and/or the like), and/or the like. Additional details regarding service preferences are provided in connection with FIG. 1B and FIG. 1C.

In some implementations, when the user submits the request, the request may be provided to provisioning platform 104. For example, the request may be provided to provisioning platform 104 via a second interface, such as an application programming interface (API) or another type of communication interface. In the example shown, the may input, as part of the request, a service type of a VPN, IP address information of the set of endpoint devices that are part of the set of client sites 106, and location information for the set of client sites 106.

In this way, provisioning platform 104 receives the request for the service.

Figure 1B:
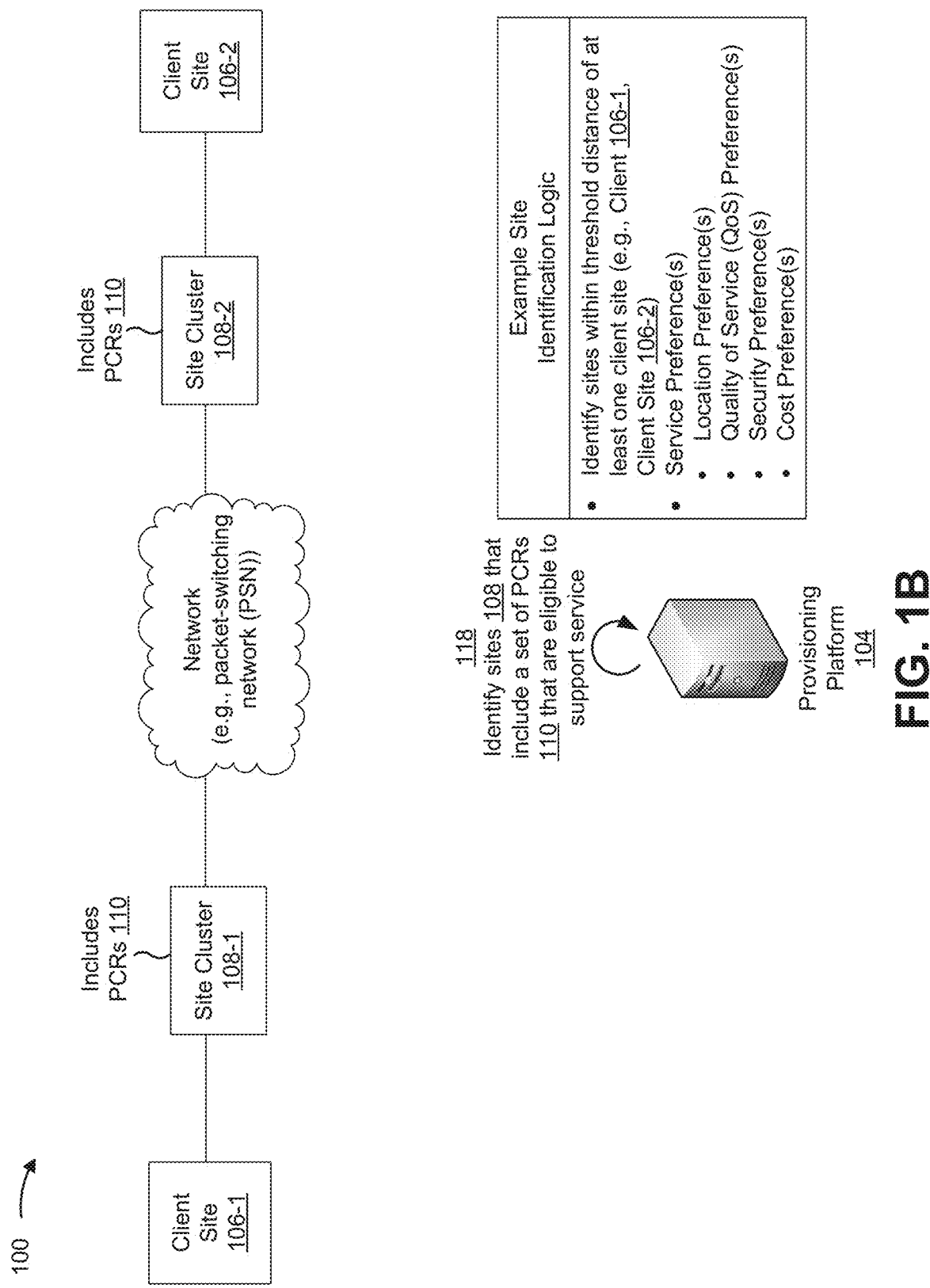

As shown in FIG. 1B, and by reference number 118, provisioning platform 104 may identify the set of sites 108 that include the set of PCRs 110 that are eligible to support the service. For example, provisioning platform 104 may, based on information included in the request, identify the set of sites 108 that include the set of PCRs 110 that are eligible to support the service (e.g., from a master set of available sites 108 and that host a master set of available PCRs 110). A PCR 110 may be eligible to support the service if a geographic location of a particular site 108 satisfies one or more configured distance rules, such as a distance rule indicating that the geographic location of the particular site 108 must be within a threshold distance of a particular client site 106, a distance rule indicating that a geographic location of the particular site 108 must be within a defined geographic area that is between two or more client sites 106, a distance rule indicating that a geographic location of the particular site 108 cannot be within a defined geographic area, and/or the like.

In some implementations, provisioning platform 104 may identify the set of sites 108 based on location information included in the request. For example, the request may include location information that identifies geographic locations of the set of client sites 106. Additionally, provisioning platform 104 may have access to a data structure that stores other location information that identifies geographic locations for the master set of available sites 108. The master set of available sites 108 may be a superset that includes the set of sites 108 and which may host the master set of available PCRs 110 (e.g., which may be a superset that includes the set of PCRs 110 that are eligible to support the service). In this case, provisioning platform 104 may reference the request to identify the location information, may reference the data structure to identify the other location information, and may compare the location information and the other location information. Furthermore, provisioning platform 104 may identify the set of sites 108 by determining, based on the comparison, that the set of sites 108 have particular geographic locations that satisfy the one or more distance rules (e.g., the distance rule indicating that a site 108 must be within the threshold distance of at least one client site 106).

In the example shown, provisioning platform 104 may identify, as the set of sites 108, site cluster 108-1 and site cluster 108-2. For example, the request may include location information that identifies a first geographic location of client site 106-1 and may identify a second geographic location of client site 106-2. In this example, provisioning platform 104 may reference the request to identify the location information for client site 106-1 and client site 106-2, may reference the data structure to identify the other location information that identifies the geographic locations for the master set of available sites 108, and may compare the location and the other location information. Additionally, provisioning platform 104 may determine, based on the comparison, that the set of sites 108 (e.g., which may be included in site cluster 108-1 and site cluster 108-2) have particular geographic locations that are within the threshold distance of client site 106-1 and/or client site 106-2. This may allow provisioning platform 104 to identify site cluster 108-1 and site cluster 108-2 as the set of sites 108 that include the set of PCRs 110 that are eligible to support the service.

Additionally, or alternatively, provisioning platform 104 may apply another type of distance rule to identify the set of sites 108. For example, rather than identifying sites 108 that are within a threshold distance of at least one client site 106, provisioning platform 104 may identify sites 108 that are within a threshold geographic area between the set of client sites 106. As an example, if client site 106-1 is located in a first city and client site 106-2 is located in a second city, provisioning platform 104 may apply a distance rule that identifies the sites 108 that are located between the first city and the second city (e.g., where the distance rule describes configurable boundaries that define how a site 108 would qualify as being between the first city and the second city).

Additionally, or alternatively, provisioning platform 104 may identify the set of sites 108 based on other information included in the request. For example, in some cases, the request may not include location information for the set of client sites 106. In these cases, provisioning platform 104 may have access to a data structure that stores the location information for the set of client sites 106. For example, the request may include an entity identifier for the entity and/or a user identifier for the user associated with the entity, and provisioning platform 104 may use the entity identifier and/or the user identifier to search the data structure to identify the location information for the set of client sites 106. This may allow provisioning platform 104 to identify the set of sites 108, without the request including the location information for the set of client sites 106.

In other cases, the request may include service preferences information and/or one or more service preference identifiers corresponding to service preferences information. In these cases, provisioning platform 104 may use the entity identifier and/or the user identifier included in the request to search the data structure to identify the service preferences information. This may allow provisioning platform 104 to identify the set of sites 108 based on the service preferences information (e.g., in addition to identifying the set of sites 108 based on the location information, instead of identifying the set of sites 108 based on the location information, and/or the like).

As an example, the service preferences information may include a distance rule indicating that particular PCRs 110 that are included in particular sites 108 may not be identified as eligible to support the service if geographic locations of the particular sites 108 are within a defined geographic area, are outside of the defined geographic area, and/or the like. In this example, provisioning platform 104 may compare location information for the set of client sites 106 with the other location information for the master set of sites 108 and may determine that particular geographic locations for the set of sites 108 are within the threshold distance of the geographic locations of the set of client sites 106 (as described above). Additionally, provisioning platform 104 may compare additional location information that identifies the defined geographic area with the location information that identifies the particular geographic locations for the set of sites 108 to determine which sites 108, of the set of sites 108, are outside of the defined geographic area. In this case, provisioning platform 104 may identify the sites 108 that are outside of the defined geographic and that are within the threshold distance of a client site 106 as the set of sites 108 that include PCRs 110 that are eligible to support the service.

In this way, provisioning platform 104 identifies the set of sites 108 that include the set of PCRs 110 that are eligible to support the service.

Figure 1C:
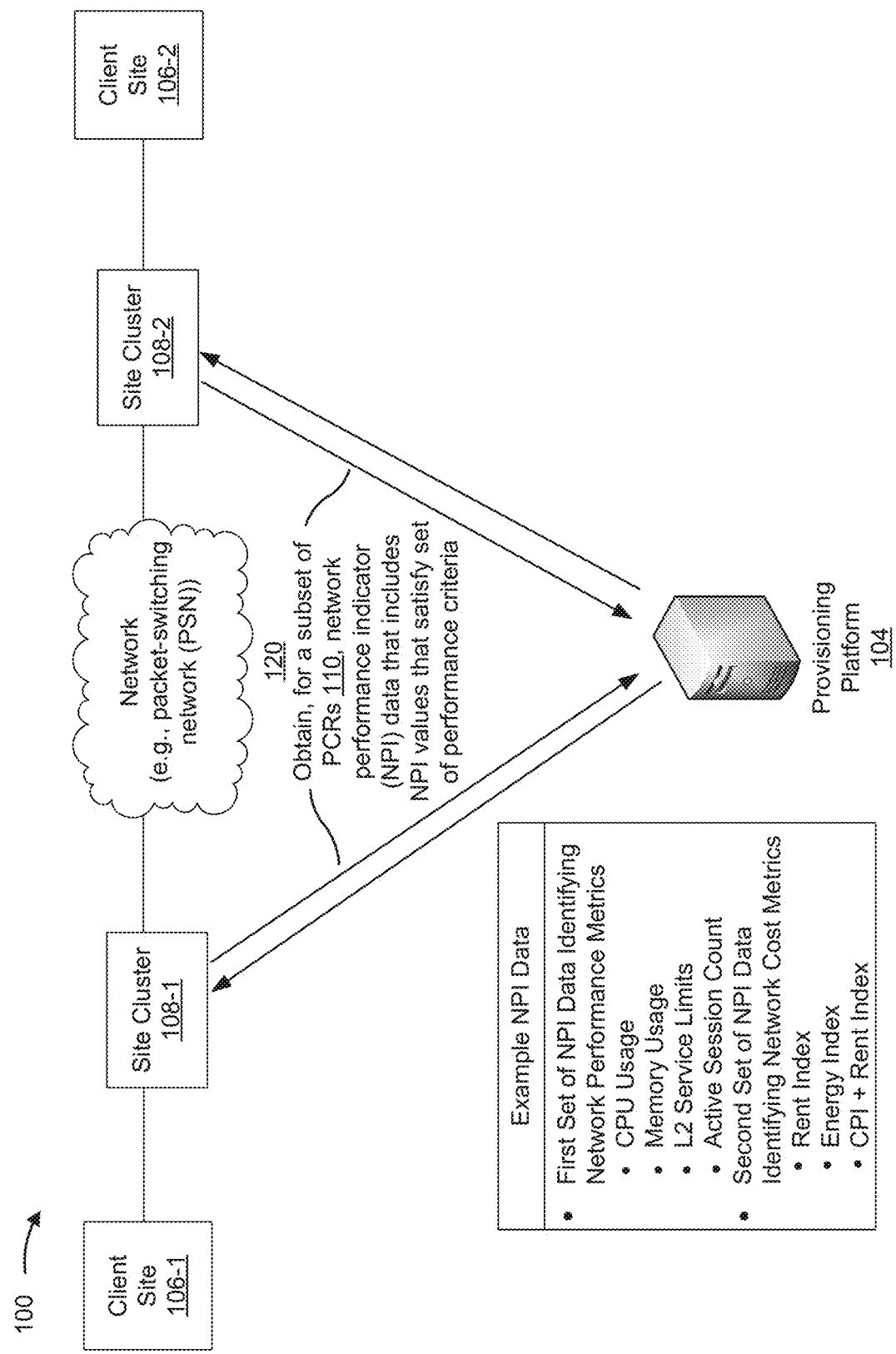

As shown in FIG. 1C, and by reference number 120, provisioning platform 104 may obtain, for a subset of PCRs 110, network performance indicator (NPI) data that includes NPI values that satisfy a set of performance criteria. For example, provisioning platform 104 may have access to performance criteria data that identifies a set of performance criteria and may use the performance criteria data to obtain the NPI data that includes NPI values that satisfy the set of performance criteria.

The NPI data may include a first set of NPI data that identifies network performance metrics associated with the subset of PCRs 110, a second set of NPI data that identifies network cost metrics associated with maintaining the subset of PCRs 110, a third set of NPI data that identifies network performance preferences of the entity, and/or the like, as will each be defined further herein. The NPI data may identify network performance metrics, network cost metrics, and/or preferred network performance and/or network cost metrics for a single PCR 110, for a group of PCRs 110 that are associated with a site 108, for a group of PCRs 110 that are associated with a geographic region and/or sub-region, and/or the like. The NPI data may include metrics that identify performance totals and/or cost totals over a given time period, metrics that identify performance totals and/or cost averages over a given time period, and/or the like. The set of performance criteria may include a first set of performance criteria that corresponds to the first set of NPI data, a second set of performance criteria that corresponds to the second set of NPI data, a third set of performance criteria that corresponds to the third set of NPI data, and/or the like, as will each be defined further herein.

The first set of NPI data that includes the network performance metric values may include a set of central processing unit (CPU) usage rates, a set of memory usage rates, a set of active session counts that identify a number of active sessions being supported by one or more PCRs 110, a set of layer-2 service limitations, and/or the like. The one or more active session count metrics may include one or more active session counts for a number of IP version 4 (IPv4) sessions (e.g., an active session count identifying a total number of IPv4 provider edge-customer edge (PE-CE) sessions, an active session count identifying a number of Border Gateway Protocol (BGP) sessions, an active session count identifying a number of routing information protocol (RIP) sessions, an active session count identifying a number of open shortest path first (OSPF) sessions, and/or the like), one or more active session counts for a number of IP version 6 (IPv6) sessions (e.g., an active session count identifying a total number of IPv6 PE-CE sessions, an active session count identifying a number of BGP sessions, and/or the like), and/or the like. The set of layer-2 service limitations may include a local switching limitation, a switched ELINE limitation, a PBB-EVPN limitation, a dedicated ELINE limitation, and/or the like.

The second set of NPI data may include a first metric value that specifies a cost associated with owning or renting a group of one or more PCRs 110 (e.g., as may be determined by a rent index), a second metric value that specifies a cost associated with an amount of resources consumed by a group of one or more PCRs 110 (e.g., as may be determined by an energy index), a third metric value that specifies a market rate for owning or renting the group of one or more PCRs 110 (e.g., as may be determined by a consumer price index (CPI)), and/or the like. The third set of NPI data may include data included in the first set of NPI data, data included in the second set of NPI data, NPI values describing device configuration information of one or more PCRs 110, NPI values describing one or more software functions of one or more PCRs 110, and/or the like.

The first set of performance criteria may include a set of threshold CPU usage rates, a set of threshold memory usage rates, a set of threshold active session count values, a set of threshold layer-2 service limitation values, and/or the like. As a specific example, the first set of performance criteria may include a threshold routing engine (RE) CPU usage rate associated with one or more REs of one or more PCRs 110, a threshold line card (LC) CPU usage rate associated with one or more LCs of one or more PCRs 110, and/or the like. As another specific example, the first set of performance criteria may include a threshold modular port concentrator (MPC) heap memory usage rate associated with one or more packet forwarding devices (PFDs) of one or more PCRs 110, a threshold next hop memory usage rate associated with one or more PFDs of one or more PCRs 110, and/or the like.

The second set of performance criteria may correspond to the second set of NPI data and may include a threshold cost associated with owning or renting a group of one or more PCRs 110, a threshold cost associated with an amount of resources consumed by a group of one or more PCRs 110, a threshold cost associated with owning or renting a site 108, a threshold cost associated with an amount of resources consumed by a group of one or more sites 108, and/or the like.

The third set of performance criteria may correspond to the third set of NPI data and may include performance criteria associated with one or more preferences of the entity, such as device configuration criteria for one or more PCRs 110 (e.g., which may be used to determine whether the one or more PCRs 110 are compliant with a path preference of the entity), a QoS criteria for one or more PCRs 110 (e.g., which may be used to determine whether the one or more PCRs 110 are compliant with a QoS preference of the entity), a security criteria for one or more PCRs 110 (e.g., which may be used to determine whether the one or more PCRs 110 are compliant with a security preference of the entity), a cost criteria for one or more PCRs 110 (e.g., which may be used to determine whether the one or more PCRs 110 are compliant with a cost preference of the entity), and/or the like. As a specific example, the device configuration criteria may be used to verify whether one or more PCRs 110 are capable of supporting the service with a fiber connection and/or another type of connection. As another specific example, the QoS criteria may be used to verify whether one or more PCRs 110 include software functions that are able to satisfy a QoS preference of the entity.

In some implementations, provisioning platform 104 may obtain the first set of NPI data based on the first set of performance criteria. For example, provisioning platform 104 may use a third interface (e.g., an API, a command language interface (CLI), and/or the like) to provide a device performance request to each respective PCR 110 of the set of PCRs 110, to a master PCR 110 at each site 108 (e.g., which may serve as a management node and be tasked with obtaining specific NPI data for all PCRs 110 at that site 108), and/or the like. The device performance request may include performance criteria data that identifies the first set of performance criteria, the service identifier for the service, the user identifier for the user and/or the entity identifier for the entity, a site identifier for a site 108, device identifiers for one or more PCRs 110 within the site 108, the service preferences information of the entity, and/or the like.

Continuing with the example, based on receiving the device performance request, each of the set of PCRs 110 may generate or identify particular NPI data that identifies the network performance metric values for each respective PCR 110 (and/or each respective combination of PCRs 110). In this case, a PCR 110, of the set of PCRs 110, may have access to a data structure that stores the particular NPI data. Furthermore, the PCR 110 may reference the data structure to identify the particular NPI data and may compare the particular NPI data with the performance criteria data that identifies the first set of performance criteria. In this case, the PCR 110 may determine whether the particular NPI data includes network performance metric values that satisfy the first set of performance criteria. A network performance metric value may satisfy a performance criterion by having a value that is lower than a value indicated by the performance criteria, by having a value that is higher than a value indicated by the performance criteria, by having a value that is within a threshold range higher or lower than a value indicated by the performance criteria, and/or the like. Additionally, the PCR 110 may generate a device performance response that includes the particular NPI data and may use the third interface to provide provisioning platform 104 with the device performance response.

As another example, a master PCR 110 may be configured to receive the device performance request on behalf of all (or some) PCRs 110 of a particular site 108. In this example, the master PCR 110 may, based on receiving the request, interact with other PCRs 110 that are included in the particular site 108 to obtain a group of NPI data that identifies the network performance metrics for each respective PCR 110. Additionally, the master PCR 110 may compare the group of NPI data and the performance criteria data that identifies the first set of performance criteria and may provide provisioning platform 104 with a subgroup of the group of NPI data that includes network performance metric values that satisfy the first set of performance criteria.

In this way, provisioning platform 104 conserves resources (e.g., processing resources, network resources, and/or the like) relative to obtaining the set of NPI data for the subset of PCRs 110 without the performance criteria data that identifies the first set of performance criteria. For example, by using the performance criteria data that identifies the first set of performance criteria when requesting the first set of NPI data, provisioning platform 104 conserves resources that would otherwise be wasted by other devices that provide provisioning platform 104 with particular NPI data for PCRs 110 that are unable to efficiently and/or effectively support the service, conserves session resources that might be wasted if packet loss and/or other QoS issues had occurred due to inefficient and/or ineffective configuration and/or deployment of PCRs 110 that are unable to support the service, and/or the like.

Additionally, or alternatively, provisioning platform 104 may use the second set of performance criteria to obtain the second set of NPI data that includes network cost metric values that satisfy the second set of performance criteria. For example, another platform may maintain the second set of performance criteria. In this case, provisioning platform 104 may use a fourth interface to provide the other platform with a request for the second set of performance criteria. This may cause the other platform to provide provisioning platform 104 with the second set of performance criteria.

Furthermore, provisioning platform 104 may include the second set of performance criteria in one or more device performance requests that are to be provided to the subset of PCRs 110. For example, provisioning platform 104 may provide, to a PCR 110, a device performance request that includes the second set of performance criteria. In this case, the PCR 110 may identify and/or generate particular NPI data, of the second set of NPI data, and may compare network cost metric values included in the particular NPI data with the second set of performance criteria. If the network cost metric values satisfy the second set of performance criteria, the PCR 110 may provide provisioning platform 104 with a device performance response.

In some implementations, provisioning platform 104 may generate the second set of NPI data that includes network cost metric values that satisfy the second set of performance criteria. For example, the other platform may maintain index data that identifies an index (e.g., a rent index, an energy index, a CPI, and/or the like) for a geographic area (e.g., a city, a state, and/or the like) that includes the set master set of available sites 108. In this case, provisioning platform 104 may use the fourth interface to provide the other platform with a request for the index data which may cause the other platform to provide provisioning platform 104 with the index data. Additionally, provisioning platform 104 may generate the second set of NPI data (e.g., the first metric value, the second metric value, the third metric value, and/or the like) based on the index data. For example, provisioning platform 104 may process the index data to generate a metric value for a particular PCR 110, for a group of PCRs 110, for a site 108, for a group of sites 108, and/or the like. Furthermore, provisioning platform 104 may compare each respective metric value with the corresponding threshold cost values to determine whether the network cost metric values satisfy the second set of performance criteria.

In some implementations, provisioning platform 104 may sort the first set of NPI data for the subset of PCRs 110 based on the network cost metric values included in the second set of NPI data. For example, if ten PCRs 110 are included in a particular site 108 and have a first set of NPI data that satisfies the first set of performance criteria, then provisioning platform 104 may sort the first set of NPI data for the ten PCRs 110, such that a list identifying the ten PCRs 110 may rank the ten PCRs 110 from a PCR 110 associated with a lowest network cost metric value to a PCR 110 associated with a highest network cost metric value.

In some implementations, provisioning platform 104 may store the second set of NPI data and/or the third set of NPI data. For example, the second set of NPI data (e.g., that includes the rent index, the cost index, and/or the like) may include values that do not change frequently. Consequently, provisioning platform 104 may only need to obtain the second set of NPI data periodically, such as once a week, once a month, and/or the like. In this case, provisioning platform 104 may use a data structure to store the second set of NPI data, such that the data structure may be referenced when a new service request is received (e.g., without having to use the fourth interface to obtain the second set of NPI data from the other platform).

As an example, the data structure may store the second set of NPI data in a manner that associates the second set of NPI data based on particular sites 108. For example, for each site 108, the data structure may associate a site identifier, location information, and particular NPI data, of the second set of NPI data, that is applicable to each respective site 108 (e.g., a rent index that applies to each respective site 108, an energy index that applies to each respective site 108, and/or the like).

By using the second set of performance criteria to obtain the second set of NPI data, provisioning platform 104 identifies optimal PCRs 110 that may be recommended to support the service. This conserves resources that an inferior solution (e.g., that does not obtain the second set of NPI data) might otherwise waste to identify sub-optimal PCRs 110 to recommend to support the service, resources that the inferior solution might waste to configure and/or deploy the sub-optimal PCRs 110, idle resources that the inferior solution might waste based on not configuring and/or deploying the optimal PCRs 110, and/or the like.

Additionally, or alternatively, provisioning platform 104 may obtain the third set of NPI data that includes network performance preference metric values and/or the network cost preference values that satisfy the third set of performance criteria. For example, provisioning platform 104 may have access to a data structure that stores performance criteria data that identifies the third set of performance criteria. In this case, provisioning platform 104 may include the third set of performance criteria in one or more device performance requests that are to be provided to the subset of PCRs 110. For example, provisioning platform 104 may provide, to a PCR 110, a device performance request that includes the third set of performance criteria. In this case, the PCR 110 may identify and/or generate particular NPI data, of the third set of NPI data, and may compare network performance preference metric values and/or network cost preference metric values (e.g., that are identified in the particular NPI data) with the third set of performance criteria. If the network performance preference metric values and/or the network cost metric values satisfy the third set of performance criteria, the PCR 110 may provide provisioning platform 104 with a device performance response.

In some implementations, provisioning platform 104 may obtain the NPI data for the set of PCRs 110 that are eligible to support the service (e.g., without using the set of performance criteria as a filter). For example, provisioning platform 104 may obtain the NPI data for each PCR 110, of the set of PCRs 110, in a manner described above. In this case, provisioning platform 104 may then select a subset of PCRs 110, of the set of PCRs 110, based on the subset of PCRs 110 satisfying the set of performance criteria. In this way, provisioning platform 104 locally performs the processing needed to identify the subset of PCRs 110 that have NPI data that includes the NPI values that satisfy the set of performance criteria. This reduces a utilization of resources of the set of PCRs 110 (e.g., relative to each PCR 110 having to perform additional processing to determine whether particular NPI data for each PCR 110 is associated with particular NPI values that satisfy the set of performance criteria).

In some implementations, provisioning platform 104 may be configured with a trigger condition (e.g., a configured time period or time interval and/or another type of trigger) that causes provisioning platform 104 to determine whether to obtain the NPI data for the set of PCRs 110 that are eligible to support the service. For example, provisioning platform 104 may determine whether to obtain the NPI data based on whether a present time period matches a configured time period, based on whether a configured time interval has passed, and/or the like. In this case, provisioning platform 104 may be prevented from making (or permitted to make) an API call to obtain the NPI data based on whether the present time period matches the configured time period, based on whether the configured time interval has passed, and/or the like. This is because a previously obtained set of NPI data may still be relevant for identifying eligible PCRs 110. In this way, provisioning platform 104 conserves resources that would otherwise be wasted needless obtaining new NPI data when previously obtained NPI data would be relevant for identifying eligible PCRs 110, conserves resources of PCRs 110 (e.g., which might otherwise waste computing resources, input/output resources, memory resources, while obtaining the new NPI data for provisioning platform 104), and/or the like.

In this way, provisioning platform 104 obtains NPI data for the subset of PCRs 110 that satisfy the set of performance criteria.

Figure 1D:
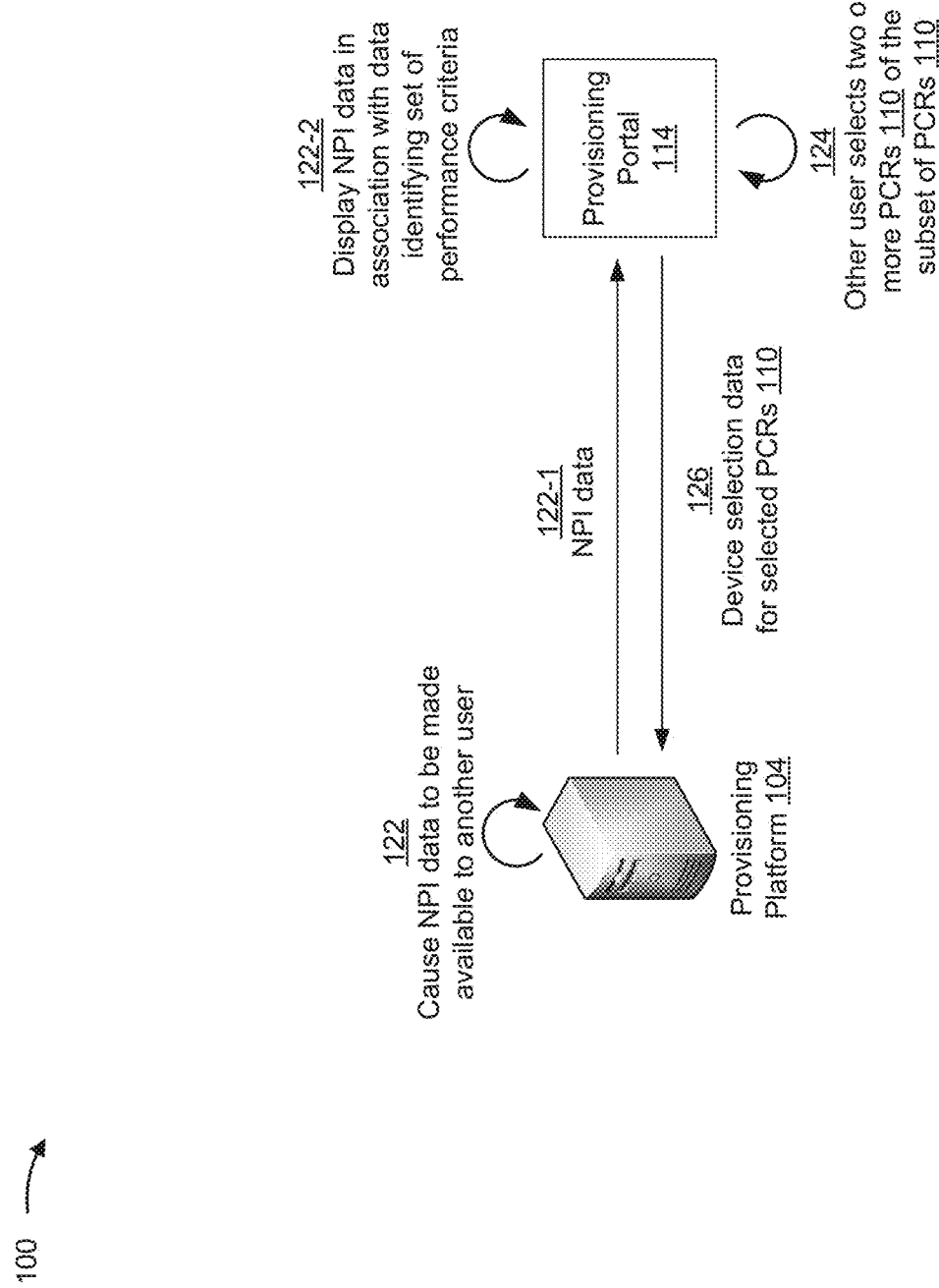

As shown in FIG. 1D, and by reference number 122, provisioning platform 104 may cause the NPI data to be made available to another user. For example, provisioning platform 104 may cause the NPI data to be made available to a fifth interface that is accessible to another user, such as a provisioning expert that has expert knowledge in configuration and/or deployment of PCRs 110.

As shown by reference number 122-1, provisioning platform 104 may use the fifth interface to provide the NPI data to provisioning portal 114. As shown by reference number 122-2, provisioning portal 114 may display the NPI data in association with the performance criteria data. For example, provisioning portal 114 may display the NPI data in association with the performance criteria data using a GUI that is part of a provisioning management application. In some implementations, the NPI data may be displayed in association with other content, such as information included in the request, service preferences information of the entity, and/or the like.

As shown by reference number 124, the other user may select two or more PCRs 110 of the subset of PCRs 110. For example, the user may view the content displayed by provisioning portal 114 and may, based on the content, select two or more PCRs 110 to support the service. In some cases, the selected PCRs 110 may be selected in a particular order (e.g., such that traffic of the session may flow between client site 106-1 and client site 106-2 via a path defined by the ordered combination of selected PCRs 110). As shown by reference number 126, this may cause provisioning portal 114 to provide provisioning platform 104 with device selection data for the selected PCRs 110.

In some implementations, provisioning platform 104 may cause recommendation data to be made available via the fifth interface that is accessible to the other user (e.g., in addition to the NPI data, instead of the NPI data, and/or the like). For example, provisioning platform 104 may use machine learning to generate recommendation data that includes one or more recommendations that specify which PCRs 110 to select (e.g., from the subset of PCRs 110). In this case, provisioning platform 104 may have trained a data model and/or may be configured with a trained data model. The data model may have been trained to output a set of scores that correspond to the subset of PCRs 110 and that indicate a likelihood of each respective PCR 110 being an appropriate PCR 110 to select for supporting the service.

In this case, the data model may have been trained by using one or more machine learning techniques to process historical data, such as historical request information, historical NPI data, historical service preferences information of the entity and/or other entities, and/or the like. The one or more machine learning techniques may include a classification-based technique, a regression-based technique, a clustering-based technique, a technique using a neural network, and/or the like.

In some implementations, the data model may be trained based on trends identified in the historical data. For example, if a group of PCRs 110 are used for dedicated ELINE services (e.g., premium services), and users (e.g., provisioning experts) often avoid assigning non-premium services to those same PCRs 110, provisioning platform 104 may, while training the data model, identify a trend that non-premium services are rarely assigned to PCRs 110 that are presently being used for other dedicated ELINE services. Consequently, if a particular PCR 110 is presently supporting a dedicated ELINE service, and is included in the subset of PCRs 110, the data model may assign the particular PCR 110 a lower score than other PCRs 110 that are part of the subset of PCRs 110 but that are not presently supporting dedicated ELINE services.

To use the trained data model, provisioning platform 104 may provide, as input to the data model, information included in the request, the NPI data, the service preferences information of the entity, and/or the like (collectively referred to as input data). This may cause the data model to process the input data to output a set of scores that correspond to subset of PCRs 110 and that indicate a likelihood of each respective PCR 110 being an appropriate PCR 110 to select for supporting the service. Furthermore, provisioning platform 104 may use the set of scores to recommend particular PCRs 110 to the user. For example, provisioning platform 104 may recommend particular PCRs 110 with scores that satisfy a scoring threshold, may recommend particular PCRs 110 with better scores than other PCRs 110, may recommend the entire subset of PCRs 110 but may rank the subset of PCRs 110 based on the set of scores, and/or the like.

In some implementations, provisioning platform 104 may automatically select the two or more PCRs 110 (e.g., without the assistance of the other user). For example, provisioning platform 104 may automatically select the two or more PCRs 110 based on confidence scores determined using the data model, based on scoring the subset of PCRs 110 using a set of scoring rules, and/or the like.

In this way, provisioning platform 104 allows the other user to consider the NPI data for the subset of PCRs 110 when selecting the two or more PCRs 110 that are to be used to support the service.

Figure 1E:
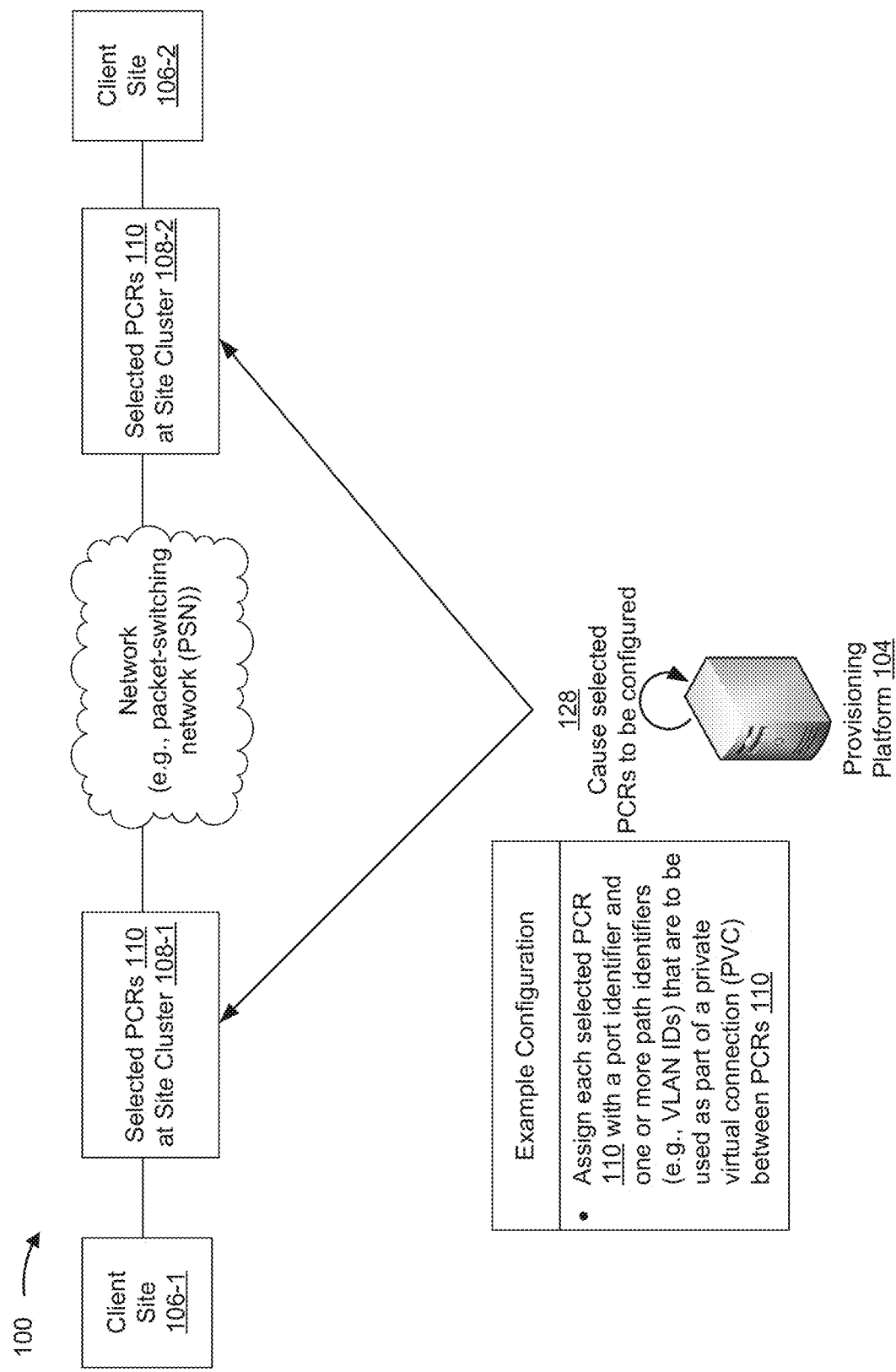

As shown in FIG. 1E, and by reference number 128, provisioning platform 104 may cause the selected PCRs 110 to be configured. For example, provisioning platform 104 may perform a set of actions to cause the selected PCRs 110 to be configured. In this case, provisioning platform 104 may determine a best-path through the network and may configure each selected PCR 110 with one or more port identifiers and one or more path identifiers (e.g., VLAN identifiers, and/or the like). The path through the network may, for example, form a private virtual connection (PVC) between client site 106-1 and client site 106-2.

To provide a specific example, provisioning platform 104 may include a layer 2 subsystem, a layer 3 subsystem, and a configuration and deployment subsystem. In this example, provisioning portal 114 may have provided a logical port assignment request to the layer 2 subsystem (e.g., while providing provisioning platform 104 with the device selection data, as part of a separate transmission of data, and/or the like). The logical port assignment request may include a site identifier for a particular site 108 that includes at least one selected PCR 110. The layer 2 subsystem may provide the logical port assignment request to the configuration and deployment subsystem, which may store port information for one or more ports that are to be assigned to the selected PCR 110 that is included in the particular site 108. Next, the configuration and deployment subsystem may provide a logical port assignment response to the layer 2 subsystem, which may cause the layer 2 subsystem to provide the logical port assignment response to provisioning portal 114.

Continuing with the example, the layer 2 subsystem may provide the configuration and deployment subsystem with a logical port provisioning request. This may cause the configuration and deployment subsystem to interact with the selected PCR 110 to configure the one or more ports (e.g., using the port information generated or obtained during the logical port assignment process). Furthermore, the configuration and deployment subsystem may provide the layer 2 subsystem with an indication of whether the one or more ports have been configured.

Continuing with the example, the layer 2 subsystem may provide, to the configuration and deployment subsystem, a PVC assignment request. This may cause the configuration and deployment subsystem to store PVC information that is needed to establish the PVC between client site 106-1 and client site 106-2. The PVC information may include, for example, a PVC identifier that identifies the PVC, one or more path identifiers that specify a next-hop for traffic that flows via the PVC, a previous hop for the traffic, and/or the like. Additionally, the configuration and deployment subsystem may provide the layer 2 subsystem with a PVC assignment response.

Continuing with the example, the layer 2 subsystem may provide the configuration and deployment subsystem with a PVC provisioning request. The PVC provisioning request may include a PVC identifier that identifies the PVC. This may allow the configuration and deployment subsystem to interact with the selected PCR 110 to configure the PVC. For example, the configuration and deployment subsystem may configure the PVC by providing the selected PCR 110 with the PVC information that includes the one or more path identifiers, such that the PVC establishes a virtual connection between the selected PCR 110 and one or more other selected PCRs 110 (e.g., a previous hop PCR 110, a next hop PCR 110, and/or the like). The configuration and deployment subsystem may provide the layer 2 subsystem with a PVC provisioning response to indicate that the provisioning has been completed.

Continuing with the example, the layer 2 subsystem may provide the layer 3 subsystem with a layer 3 prebuild request. This may cause the layer 3 subsystem to create site information for the particular site 108. Additionally, the layer 3 subsystem may obtain the port information and/or the PVC information from the configuration and deployment subsystem.

In this way, provisioning platform 104 causes the selected PCRs 110 to be configured to support the service.

Figure 1F:
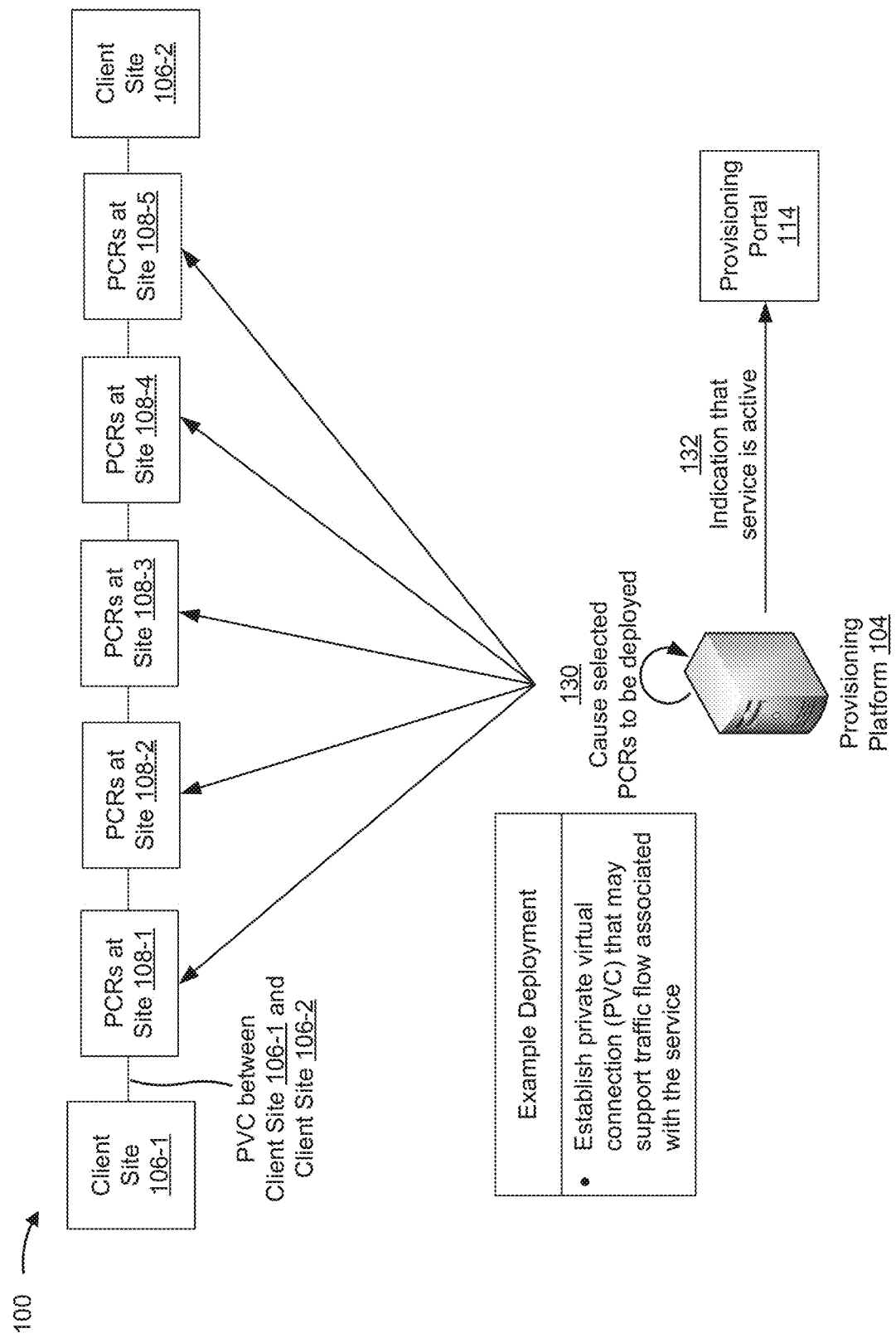

As shown in FIG. 1F, and by reference number 130, provisioning platform 104 may cause the selected PCRs 110 to be deployed. For example, provisioning platform 104 may perform another set of actions to cause the selected PCRs 110 to be deployed. In this case, provisioning platform 104 may deploy the selected PCR 110 by activating the PVC that has been configured. This may allow traffic flow associated with the service to be routed between client site 106-1 and client site 106-2 (e.g., using the selected PCRs 110).

Continuing with the example described with regard to FIG. 1E, the layer 3 subsystem may provide a deployment request to the configuration and deployment subsystem. In this example, the deployment request may be provided to the configuration and deployment subsystem. Additionally, the configuration and deployment subsystem may interact with the selected PCR 110 to deploy the service. Furthermore, the configuration and deployment subsystem may provide the layer 3 subsystem with a deployment response. This may allow the layer 3 subsystem to provide the layer 2 subsystem with layer 3 milestone data that indicates whether the service has been deployed on the selected PCR 110 (and/or on any other selected PCRs 110 that were not shown in this example but were configured and deployed to support the service).

In this way, provisioning platform 104 efficiently and effectively configures and/or deploys the two or more PCRs 110 to support the service. By identifying the subset of PCRs 110 that are associated with NPI values that satisfy the set of performance criteria (and that also have optimal geographic locations), provisioning platform 104 conserves resources (e.g., processing resources, network resources, and/or the like) that an inferior solution would waste identifying a sub-optimal group of PCRs 110 (e.g., by identifying the sub-optimal group of PCRs 110 exclusively based on the location information), conserves resources that would otherwise be wasted configuring and/or deploying particular PCRs 110 that have insufficient resources to support the service, and/or the like. Furthermore, the provisioning platform conserves financial resources of an entity requesting the service (e.g., because the entity would not have to waste additional financial resources on a less cost effective solution).

As indicated above, FIGS. 1A-1F are provided as one or more examples. Other examples can differ from what is described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
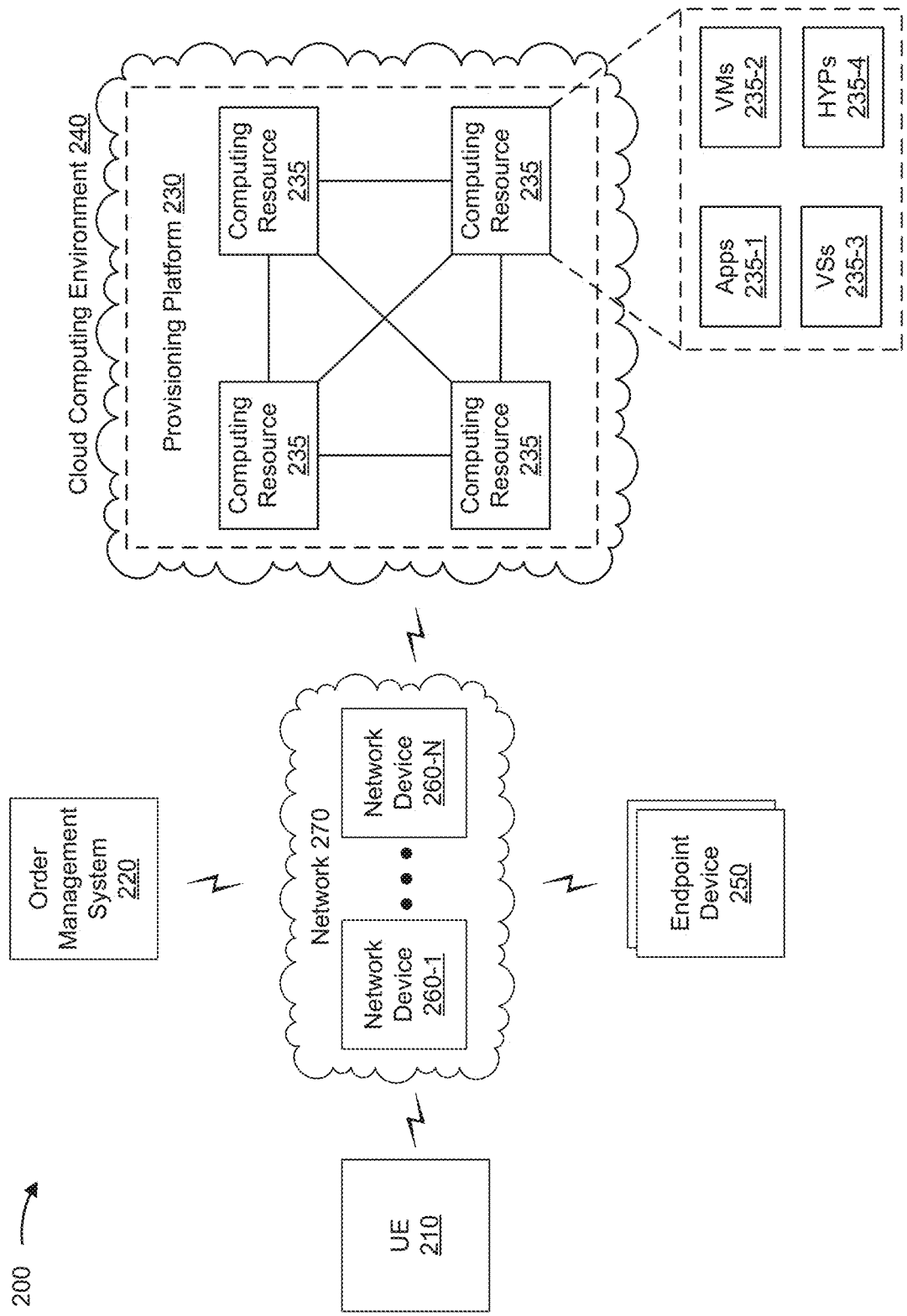
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user equipment (UE) 210, an order management system 220, a provisioning platform 230 hosted within a cloud computing environment 240, a group of endpoint devices 250, a group of network devices 260 (shown as network device 260-1 through network device 260-N), and a network 270. Devices of environment 200 may interconnect via wired connections, wireless connections, or a combination of wired and wireless connections.

UE 210 includes one or more devices capable of receiving, storing, generating, processing, and/or providing information associated with a service. For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device.

In some implementations, a first UE 210 may be used to access a first interface of order management system 220. For example, a user may interact with UE 210 to submit a request for a service. In some implementations, a second UE 210 may be used to access a second interface of a provisioning portal (e.g., which may be part of provisioning platform 230 and/or hosted by a separate server device). For example, another user may interact with the second UE 210 to access the second interface, which may be part of a provisioning management application that is capable of displaying information that may assist the other user in selecting one or more network devices 260 to support a service.

Order management system 220 includes one or more devices capable of receiving, storing, generating, processing, and/or providing information associated with a service. For example, order management system 220 may include a server device or a group of server devices. In some implementations, order management system 220 may support a front end with the first interface described above (e.g., which may assist the user in submitting the request for the service). In some implementations, order management system 220 may provide the request to provisioning platform 230.

Provisioning platform 230 includes one or more devices capable of receiving, storing, generating, processing, and/or providing information associated with the service. For example, provisioning platform 230 may include a server device (e.g., a host server, a web server, an application server, etc.), a data center device, or a similar device.

In some implementations, provisioning platform 230 may have access to one or more data structures that store information described in connection with FIGS. 1A-1F. In some implementations, provisioning platform 230 may use one or more application programming interfaces (APIs), one or more command language interfaces (CLIs), and/or the like, to communicate with UE 210, order management system 220, endpoint device 250, and/or network device 260. For example, provisioning platform 230 may communicate with the first UE 210 and/or order management system 220 using a first API, may communicate with a set of network devices 260 using a group of other APIs and/or CLIs, may communicate with a server device that stores particular network performance indicator (NPI) (e.g., the NPI data described in FIGS. 1A-1F as the second set of NPI data) using a second API, may communicate with one or more endpoint devices 250 using a third API, may communicate with a provisioning portal using a fourth API (e.g., if the provisioning portal is hosted by a server device outside of provisioning platform 230), and/or the like. In some implementations, provisioning platform 230 may use different interfaces (e.g., different APIs, different CLIs, and/or the like) for different network devices 260, depending on a particular vendor that has manufactured each network device 260.

In some implementations, as shown, provisioning platform 230 may be hosted in cloud computing environment 240. While implementations described herein describe provisioning platform 230 as being hosted in cloud computing environment 240, in some implementations, provisioning platform 230 might not be cloud-based (i.e., may be implemented outside of a cloud computing environment) or may be partially cloud-based.

Cloud computing environment 240 includes an environment that hosts provisioning platform 230. Cloud computing environment 240 may provide computation, software, data access, storage, etc. services that do not require end-user knowledge of a physical location and configuration of system(s) and/or device(s) that hosts provisioning platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host provisioning platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by UE 210, order management system 220, endpoint device 250, and/or network device 260. Application 235-1 may eliminate a need to install and execute the software applications on these devices. For example, application 235-1 may include software associated with provisioning platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., UE 210, order management system 220, endpoint device 250, and/or network device 260), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Endpoint device 250 includes one or more devices capable of receiving, generating, processing, and/or providing traffic associated with the service. For example, endpoint device 250 may include a server device, a desktop computer, a laptop computer, a telephone (e.g., a radiotelephone, a smart phone, and/or the like), a tablet computer, a personal gaming system, and/or another type of communication device. In some implementations, a group of endpoint devices 250 may send and/or traffic associated with the service (e.g., using a group of network devices 260 as an intermediary).

Network device 260 includes one or more devices capable of receiving, processing, storing, routing, and/or providing traffic (e.g., a packet, a file, etc.) associated with the service. For example, network device 260 may include a router, such as a private cloud router (PCR), a label switching router (LSR), a label edge router (LER), an ingress router, an egress router, a provider router (e.g., a provider edge router, a provider core router, etc.), a virtual router, and/or the like. Additionally, or alternatively, network device 260 may include a gateway, a switch, a firewall, a hub, a bridge, a reverse proxy, a server (e.g., a proxy server, a cloud server, a data center server, etc.), a load balancer, and/or a similar device. In some implementations, network device 260 may be a physical device implemented within a housing, such as a chassis. In some implementations, network device 260 may be a virtual device implemented by one or more computer devices of a cloud computing environment or a data center.

In some implementations, network device 260 may provide provisioning platform 230 with the NPI data. For example, network device 260 may receive a device performance request from provisioning platform 230 and may provide provisioning platform 230 with a device performance response that includes the NPI data.

Network 270 includes one or more wired and/or wireless networks. For example, network 270 may include a telecommunications network (e.g., a fifth generation (5G) network, a fourth generation (4G) network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a packet switched network (PSN), a multiprotocol label switching (MPLS) network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
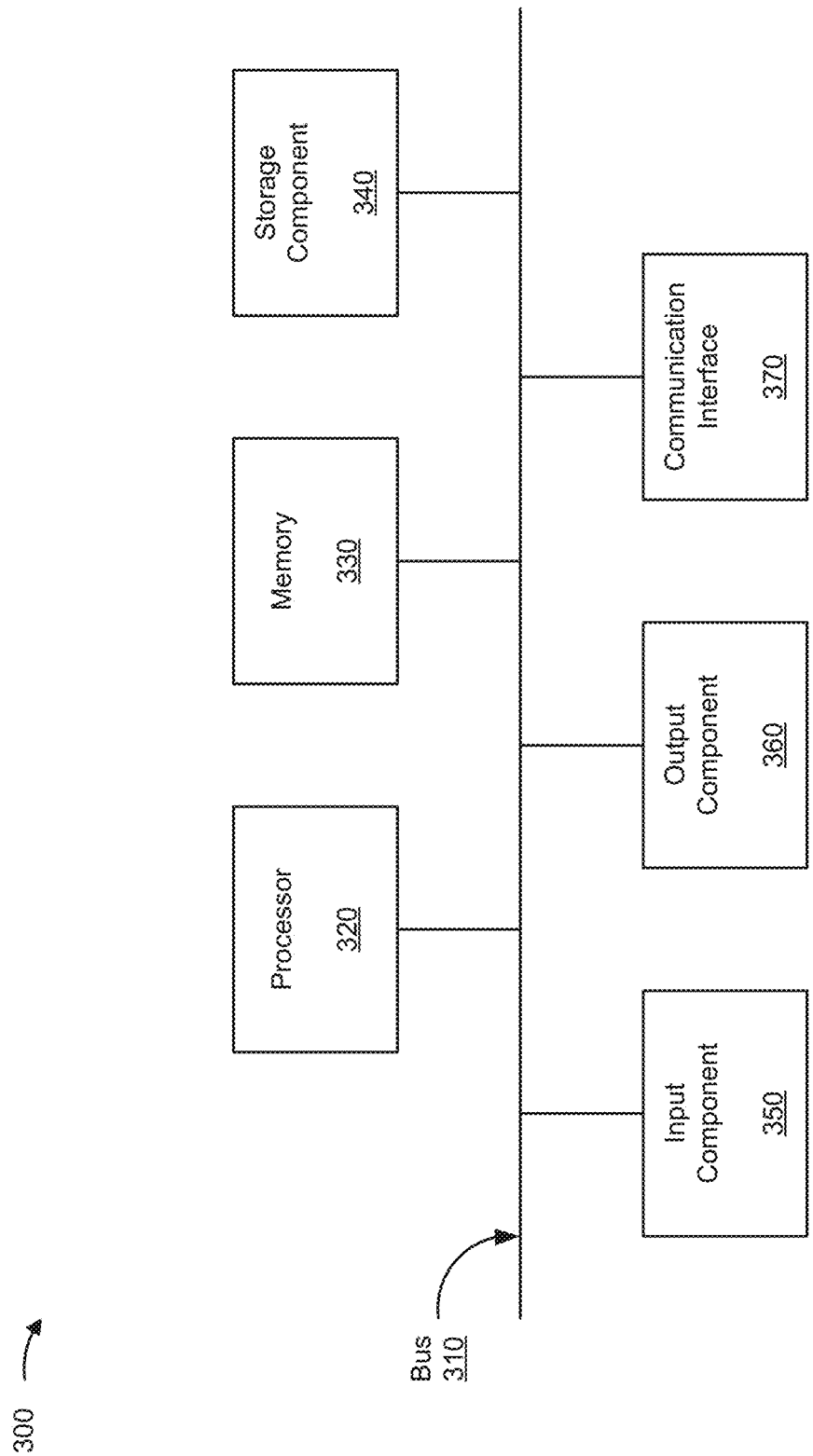
FIG. 3 is a diagram of example components of one or more devices of FIG. 2.

FIG. 3 is a diagram of example components of a device 300. Device 300 may correspond to UE 210, order management system 220, provisioning platform 230, endpoint device 250, and/or network device 260. In some implementations, UE 210, order management system 220, provisioning platform 230, endpoint device 250, and/or network device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using location information and network performance indicator (NPI) data for a set of network devices to assist in selection of a subset of the set of network devices to support a service and configuring and/or deploying the subset of the set of network devices to support the service. In some implementations, one or more process blocks of FIG. 4 may be performed by a provisioning platform (e.g., provisioning platform 230). In some implementations, one or more process blocks of FIG. 4 may be performed by another device or a group of devices separate from or including the provisioning platform, such as a user equipment (UE) (e.g., UE 210), an order management system (e.g., order management system 220), an endpoint device (e.g., endpoint device 250), a network device (e.g., network device 260), and/or the like.

As shown in FIG. 4, process 400 may include receiving a request for a service that is to be made available to devices at a set of client sites associated with an entity (block 410). For example, the provisioning platform (e.g., using computing resource 235, processor 320, memory 330, storage component 340, input component 350, output component 360, communication interface 370, and/or the like) may receive a request for a service that is to be made available to devices at a set of client sites associated with an entity, as described above.

As further shown in FIG. 4, process 400 may include identifying, based on information included in the request, a set of sites that include a set of network devices that are capable of being used to support the service (block 420). For example, the provisioning platform (e.g., using computing resource 235, processor 320, memory 330, storage component 340, input component 350, output component 360, communication interface 370, and/or the like) may identify, based on information included in the request, a set of sites that include a set of network devices (e.g., the set of network devices 260) that are capable of being used to support the service, as described above. In some implementations, the set of network devices may be a set of private cloud routers (PCRs).

In some implementations, the set of sites may be part of a master set of sites. In some implementations, when identifying the set of sites, the provisioning platform may identify, from the request, location information that identifies a first set of geographic locations of the set of client sites. Additionally, the provisioning platform may identify, by referencing a data structure, additional location information that identifies a second set of geographic locations for the master set of sites. Furthermore, the provisioning platform may compare the location information and the additional location information. This may allow the provisioning platform to determine that the set of sites have particular geographic locations that are within a threshold distance of at least one geographic location, of the first set of geographic locations, based on comparing the location information and the additional location information. Additionally, the provisioning platform may identify the set of sites based on determining that the set of sites have the particular geographic locations that are within the threshold distance of the at least one geographic location.

In some implementations, the set of sites may be part of a master set of sites. In some implementations, when identifying the set of sites, the provisioning platform may identify, from the request, an identifier that identifies the agent or the entity. Additionally, the provisioning platform may identify, by using the identifier to reference a first data structure, location information that identifies a first set of geographic locations of the set of client sites. Furthermore, the provisioning platform may identify, by referencing the first data structure or a second data structure, additional location information that identifies a second set of geographic locations for the master set of sites.

In some implementations, the provisioning platform may identify, based on the location information included in the request and a set of distance rules, the set of sites that support the set of private cloud routers (PCRs). In this case, a first distance rule, of the set of distance rules, may indicate that particular sites are to be within the threshold distance of at least one of the set of client sites. Additionally, a second distance rule, of the set of distances rules, may indicate that the particular sites are to be outside of a defined geographic area.

As further shown in FIG. 4, process 400 may include obtaining network performance indicator (NPI) data that is associated with a subset of network devices, of the set of network devices, and that includes NPI values that satisfy a set of performance criteria (block 430). For example, the provisioning platform (e.g., using computing resource 235, processor 320, memory 330, storage component 340, input component 350, output component 360, communication interface 370, and/or the like) may obtain network performance indicator (NPI) data that is associated with a subset of network devices, of the set of network devices, and that includes NPI values that satisfy a set of performance criteria, as described above.

In some implementations, the NPI data may identify at least one of: network performance metrics associated with the subset of network devices, or network cost metrics associated with maintaining the subset of network devices. In some implementations, the network cost metrics may include at least one of: a first metric that specifies a first cost to rent or own the subset of network devices, or a second metric that specifies a second cost associated with an amount of resources consumed by the subset of network devices. In some implementations, the NPI data may further identify network performance preferences of the entity. In some implementations, the set of performance criteria may include at least one of: a set of threshold network performance values that correspond to the network performance metrics, a set of threshold network cost values that correspond to the network cost metrics, or particular information that is indicative of the subset of network devices being compliant with network performance preferences of the entity.

In some implementations, when obtaining the NPI data, the provisioning platform may cause a device performance request to be provided to a group of network devices that are part of the set of network devices and that correspond to a site of the set of sites. In some implementations, when obtaining the NPI data, the provisioning platform may receive a device performance response that includes the particular NPI data that includes particular NPI values that satisfy the set of performance criteria.

In some implementations, the provisioning platform may generate, using a data model that has been trained using machine learning, recommendation data specifies particular PCRs, of the subset of PCRs, to recommend to the agent of the entity. The recommendation data may be made available to a user, as further described below.

As further shown in FIG. 4, process 400 may include causing the NPI data to be made available via an interface accessible to a user (block 440). For example, the provisioning platform (e.g., using computing resource 235, processor 320, memory 330, storage component 340, input component 350, output component 360, communication interface 370, and/or the like) may cause the NPI data to be made available via an interface accessible to a user, as described above.

In some implementations, the interface may be a graphical user interface (GUI). In some implementations, when causing the NPI data to be made available via the interface accessible to the user, the provisioning platform may provide, via an application programming interface (API), the particular NPI data for display on the GUI in a manner that shows particular NPI values identified by the particular NPI data relative to the set of performance criteria. In some implementations, the provisioning platform may cause the NPI data and the recommendation data to be made available via the interface.

As further shown in FIG. 4, process 400 may include receiving device selection data that specifies a plurality of network devices, of the subset of network devices, that have been selected by the user (block 450). For example, the provisioning platform (e.g., using computing resource 235, processor 320, memory 330, storage component 340, input component 350, output component 360, communication interface 370, and/or the like) may receive device selection data that specifies a plurality of network devices, of the subset of network devices, that have been selected by the user, as described above. In some implementations, the provisioning platform may receive the device selection data that specifies, as the plurality of PCRs that have been selected by the agent, at least one PCR that has been recommended by the data model.

As further shown in FIG. 4, process 400 may include causing the plurality of network devices to be configured in a manner that allows the plurality of network devices to support the service (block 460). For example, the provisioning platform (e.g., using computing resource 235, processor 320, memory 330, storage component 340, input component 350, output component 360, communication interface 370, and/or the like) may cause the plurality of network devices to be configured in a manner that allows the plurality of network devices to support the service, as described above.

In some implementations, when causing the plurality of network devices to be configured, the provisioning platform may cause the plurality of network devices to be configured with port identifiers and path identifiers for a virtual connection that is to be used to route traffic associated with the service. In some implementations, the provisioning platform may cause the plurality of network devices to be deployed in a manner that allows the plurality of network devices to activate a permanent virtual circuit (PVC) for routing traffic associated with the service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a device, a set of private cloud routers that are capable of being used to support a service;
   obtaining, by the device, network performance indicator (NPI) data that is associated with a subset of private cloud routers, of the set of private cloud routers, and that includes NPI values that satisfy a threshold;
   receiving, by the device, device selection data that specifies a plurality of private cloud routers, of the subset of private cloud routers; and
   causing, by the device, the plurality of private cloud routers to be deployed in a manner that allows the plurality of private cloud routers to activate a point-to-point circuit for routing traffic associated with the service.

2. The method of claim 1, further comprising:
   causing the NPI data to be made available via an interface; and
   wherein receiving the device selection data comprises:
   receiving the device selection data based on causing the NPI data to be made available.

3. The method of claim 1, wherein the NPI data identifies at least one of:
   network performance metrics associated with the set of private cloud routers, or
   network cost metrics associated with maintaining the set of private cloud routers.

4. The method of claim 1, further comprising:
   receiving a request for the service; and
   identifying, based on location information included in the request, a set of sites that support the set of private cloud routers that are within a threshold distance of a client site.

5. The method of claim 1, further comprising:
   causing the plurality of private cloud routers to be configured with port identifiers and path identifiers for a virtual connection that is to be used to route traffic associated with the service;
   wherein causing the plurality of private cloud routers to be deployed comprises:
   causing the plurality of private cloud routers to be deployed for the virtual connection.

6. The method of claim 1, wherein the NPI data includes a first set of NPI data that identifies network performance metrics and a second set of NPI data that identifies network cost metrics; and
   wherein the network cost metrics include at least one of:
   a first metric that specifies a market rate to rent or own the subset of private cloud routers, or
   a second metric that specifies a cost associated with an amount of resources consumed by the subset of private cloud routers.

7. The method of claim 1, identifying the set of private cloud routers comprises:
   identifying a set of sites that include the set of private cloud routers that are eligible to be used to support the service.

8. A device, comprising:
   one or more memories; and
   one or more processors, operatively coupled to the one or more memories, to:
   identify a set of private cloud routers that are capable of being used to support a service;
   obtain network performance indicator (NPI) data that is associated with a subset of private cloud routers, of the set of private cloud routers, and that includes NPI values that satisfy a threshold;
   receive device selection data that specifies two or more private cloud routers, of the subset of private cloud routers; and
   cause the two or more private cloud routers to be deployed in a manner that allows the two or more private cloud routers to activate a point-to-point circuit for routing traffic associated with the service.

9. The device of claim 8, wherein the one or more processors are further to:
   cause the NPI data to be made available via an interface; and
   wherein the one or more processors, when receiving the device selection data, are to:
   receive the device selection data based on causing the NPI data to be made available.

10. The device of claim 8, wherein the NPI data identifies at least one of:
    network performance metrics associated with the set of private cloud routers, or
    network cost metrics associated with maintaining the set of private cloud routers.

11. The device of claim 8, wherein the one or more processors are further to:

receive a request for the service; and identify, based on location information included in the request, a set of sites that support the set of private cloud routers that are within a threshold distance of a client site.

12. The device of claim 8, wherein the one or more processors are further to:

cause the two or more private cloud routers to be configured with port identifiers and path identifiers for a virtual connection that is to be used to route traffic associated with the service;

wherein the one or more processors, when causing the two or more private cloud routers to be deployed, are to:

cause the two or more private cloud routers to be deployed for the virtual connection.

13. The device of claim 8, wherein the NPI data includes a first set of NPI data that identifies network performance metrics and a second set of NPI data that identifies network cost metrics; and wherein the network cost metrics include at least one of:

a first metric that specifies a market rate to rent or own the subset of private cloud routers, or a second metric that specifies a cost associated with an amount of resources consumed by the subset of private cloud routers.

14. The device of claim 8, wherein the one or more processors, when identifying the set of private cloud routers, are to:

identify a set of sites that include the set of private cloud routers that are eligible to be used to support the service.

15. A non-transitory computer-readable medium storing instructions, the instructions comprising:

one or more instructions that, when executed by one or more processors of a device, cause the one or more processors to:

identify a set of private cloud routers that are capable of being used to support a service;

obtain network performance indicator (NPI) data that is associated with a subset of private cloud routers, of the set of private cloud routers;

receive device selection data that specifies a plurality of private cloud routers, of the subset of private cloud routers; and cause the plurality of private cloud routers to be deployed in a manner that allows the plurality of private cloud routers to activate a point-to-point circuit for routing traffic associated with the service.

16. The non-transitory computer-readable medium of claim 15, wherein the one or more instructions further cause the one or more processors to:

cause the NPI data to be made available via an interface; and wherein the one or more instructions, that cause the one or more processors to receive the device selection data, cause the one or more processors to:

receive the device selection data based on causing the NPI data to be made available.

17. The non-transitory computer-readable medium of claim 15, wherein the NPI data identifies at least one of:

network performance metrics associated with the set of private cloud routers, or network cost metrics associated with maintaining the set of private cloud routers.

18. The non-transitory computer-readable medium of claim 15, wherein the one or more instructions further cause the one or more processors to:

receive a request for the service to be deployed by one or more private cloud routers; and identify, based on location information included in the request, a set of sites that support the set of private cloud routers that are within a threshold distance of a client site.

19. The non-transitory computer-readable medium of claim 15, wherein the one or more instructions, that cause the one or more processors to:

cause the plurality of private cloud routers to be configured with port identifiers and path identifiers for a virtual connection that is to be used to route traffic associated with the service;

wherein the one or more instructions, that cause the one or more processors to cause the plurality of private cloud routers to be deployed, cause the one or more processors to:

cause the plurality of private cloud routers to be deployed for the virtual connection.

20. The non-transitory computer-readable medium of claim 15, wherein the one or more instructions, that cause the one or more processors to identify the set of private cloud routers, cause the one or more processors to:

identify a set of sites that include the set of private cloud routers that are eligible to be used to support the service.

* * * * *